June 16, 1942. P. L. PENDLETON 2,286,642
MAGNETICALLY CONTROLLED LOAD TESTING MACHINE
Filed May 12, 1939
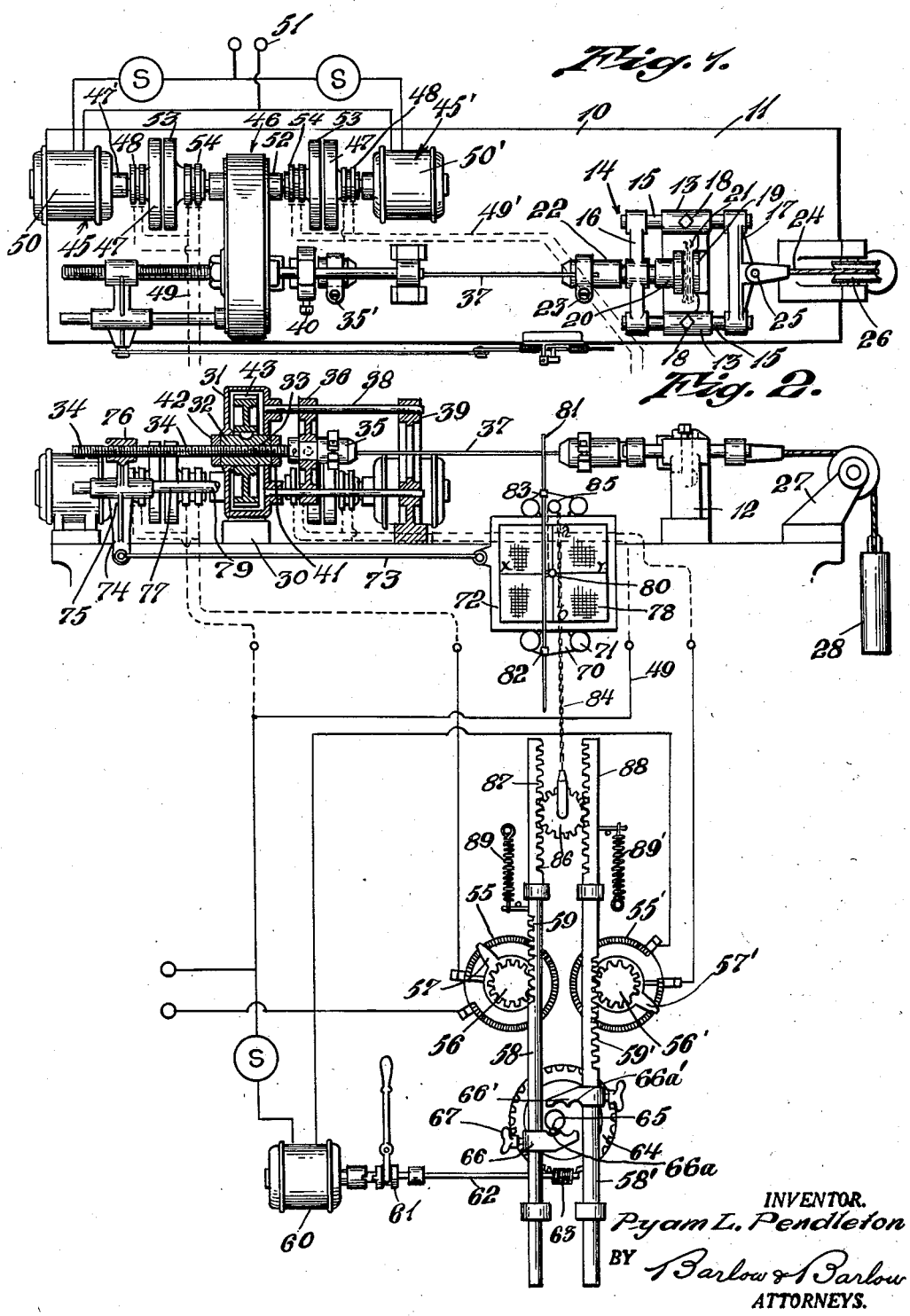
INVENTOR.
Pyam L. Pendleton
BY Barlow & Barlow
ATTORNEYS.

Patented June 16, 1942

2,286,642

UNITED STATES PATENT OFFICE 2,286,642

MAGNETICALLY CONTROLLED LOAD TESTING MACHINE

Pyam L. Pendleton, Cranston, R. I., assignor to Henry L. Scott Company, a corporation of Rhode Island Application May 12, 1939, Serial No. 273,181

15 Claims. (Cl. 265—12)

This invention relates to a machine for load measurement, more particularly for exerting known stresses upon a test specimen and measuring the resulting strains, and has particular application to the class of machine frequently referred to as constant load rate testers.

It is understood that for the purposes of the following description the words "stress" and "strain" are used in their engineering sense, that "stress" is the mutual action of one body upon another and that "strain" is the deformation of a body resulting from stress. Thus a calibration of stress is a measure of load and a calibration of strain is a measurement of deformation. The principal object of this invention is to provide an electro-magnetic means of applying stress to a specimen at a predetermined load rate which may be constant.

One of the objects of this invention is the provision of a mechanism which will exert stress upon a specimen and at the same time permit deformation of the specimen without affecting the value of stress and to make possible this deformation through an increased range of stress action from that which has heretofore been existent.

Another object of the invention is to provide for an increase in the range of stress action without increasing the bulk of the supporting structure of the machine, thereby making possible the testing of small specimens where a light stress is applied or the testing of larger and heavier specimens where a considerable amount of stress is applied, all in the same apparatus.

A further object of the invention is to minimize the inaccuracies due to friction by the elimination of relatively heavy sliding or suspended parts through and by which work is applied to the specimen under test.

Another object of the invention is to increase the possible acceleration of the stress gradient which has heretofore been limited in weighted machines by the natural gravitational acceleration of a movable mass and, at the same time, to make possible the increase of the deceleration of the stress gradient in the same manner.

Another object of the invention is the application of load through an electro-magnetic torque coupling and measuring the load by means of a calibrated electric current for the weighing of the load.

With these and other objects in view, the invention consists of certain novel features of construction, as will be more fully described, and particularly pointed out in the appended claims.

In the accompanying drawing:

Fig. 1 is a top plan view of the machine for accomplishing my improved results, the same being illustrated somewhat diagrammatically.

Fig. 2 is a diagrammatic view showing partly in section the apparatus of Fig. 1 and the arrangement diagrammatically of the moving parts for the recording mechanism which is shown only in top plan view in Fig. 1.

Previous to this invention the constant load rate class of machine, as illustrated in Patent No. 1,512,491 dated October 21, 1924, to H. L. Scott, used a heavy calibrated weight for applying stress to the test specimen necessitating a bulky supporting structure which had relatively large inherent inaccuracies due to friction while its operation was limited to a relatively narrow range of stress action and also limited, by the natural acceleration of mass due to gravity, to a maximum possible acceleration of a stress gradient.

This invention provides for a new and more efficient type of constant load rate tester having a relatively light and compact structure, capable of producing very delicate or very heavy stresses through a relatively wide range with less inherent error due to friction, arranged to make use of a calibrated, variable electric current as a power source for varying applied stresses having a predetermined gradient, and permitting control of the rate of change in a stress gradient without reference to gravitational acceleration.

The principal feature of this invention lies in the provision of means whereby unlimited strain, or elongation, may occur in a specimen under test at any point in a stress gradient, and means whereby an electric current is used to apply a constant load rate to a specimen, said freedom of strain allowing any specimen under stress to react according to its natural individual characteristics so that the sum of the work of reaction can always be equal to the sum of the work of applied stress action, minus the usual thermal losses, for any unit of time on a predetermined stress gradient. For this purpose I journal a pair of shafts co-axially and with closely abutting ends, mounting on an end of one shaft pole pieces capable of being magnetically energized according to the intensity of a calibrated exciting electric current. This shaft I cause to rotate at constant speed by any convenient means. On the abutting end of the second shaft and with the minimum practical air gap to avoid physical contact, I also mount pole pieces to serve as armatures completing magnetic linkage with the pole pieces on the first or driving shaft, said linkage producing energy of torque on the second or driven shaft which becomes a direct function of the magnitude of the exciting current.

By the use of a number of pole pieces and a relatively high speed for the constantly rotating shaft, together with electro-magnet coils connected through commutators according to well known principles of engineering, I produce at will values of magnetic coupling between the two shafts which can be adjusted to any predetermined gradient of torque.

On the driven shaft I provide for attachment through mechanical coupling to one end of a test specimen the other end of which is attached to the machine frame, the whole mechanism being devised so that torque appearing in the driven shaft will be conveyed to the test specimen as stress, and so that resulting strain in the specimen will be reflected in a rotation of the driven shaft in the same direction as the rotation of the driver. Furthermore, release of torsional stress in the driven shaft will permit counter-rotation of this shaft by the energy of strain stored in the specimen, if rupture has not occurred, the degree of said counter-rotation as compared with the original degree of rotation being a measure of fatigue or irrecoverable deformation of the specimen, said counter-rotation also being under the control of a predetermined negative stress gradient without reference to gravity.

In the operation of a machine to which my invention has been applied, the specimen is inserted in the usual manner and the driving side of the magnetic torque coupling caused to rotate at constant speed. The rotating poles are then magnetically excited to produce definite flux linkage with the driven side of the coupling exerting definite stress on the specimen according to the intensity of field excitation. As the driven side of the coupling is free to rotate, it will turn under the driving torque until the strain in the specimen has increased to a degree producing a balance of forces, the work of strain in the specimen being equal to the work of applied stress, motion of the driven side of the coupling ceasing unless change in the value of the exciting electric current occurs when the strain value in the specimen will also change for a new balance according to the natural individual molecular properties of the specimen. While the foregoing description refers to an electro-magnetic torque coupling having co-axial shafts with closely abutting ends, the same general result may be obtained from an electro-magnetic torque coupling having concentric and telescoping or superimposed parts with closely abutting internal and external peripheries. Change of strain in the specimens will lag behind change of stress and it is, therefore, customary to use stress gradients with rates of change sufficiently slow to discourage any great amount of lag. On the other hand, certain specimens may have properties of rapid fibre slip or molecular flow under stress which may require a stress gradient with a more rapid rate of change. Whatever the factor of time demanded, my invention provides a means of obtaining a greater range of rates of change in stress gradients than has heretofore been procurable in constant load rate testers. The following is a more detailed description of the present embodiment of this invention, illustrating the preferred means by which these advantageous results may be accomplished.

With reference to the drawing:

I have illustrated a machine which makes possible the testing of a specimen by the application of either tension to the specimen, the testing of a specimen by compression, or the twisting of a specimen to apply a torsional test, the selected test being performable by certain minor adjustments of the machine, such as by loosening or tightening of certain parts.

More specifically, 10 designates the bed of the machine presenting a table-like supporting structure which may be arranged at any convenient height by means of legs or frame structure below the same. Mounted upon surface 11 of this table, I have provided a tail support 12 which is provided with parallel tubular slideways 13 to slidably support a frame 14 consisting of a pair of parallel rods 15, connected at their ends by yokes 16 and 17. Set screws 18 are used for binding the rods and frame in place.

An anvil plate 19 is carried by the tail support 12 and has its face in a plane at right angles to the direction of sliding movement of the frame 14. The yoke 16 also carries centrally thereof a member 20 which has a surface parallel with the face of the anvil 19 and thus any material such as 21 which is held between these surfaces may be compressed by a thrust being applied to the frame 14. This frame 14 also carries a work specimen clamp 22 which may be suitably operated by binding screw 23 for gripping one end of a specimen. Any means urging the frame 14 in one direction may be provided, one form of which consists of a cable 24 suitably attached as at 25 to the frame 14, and then extending over a pulley 26 mounted by a bracket 27 to present the horizontal portion of the cable in substantially the plane of sliding movement of the frame. A weight 28 is on the end of the cable 24 which is free to drop and move the frame 14 through the guides 13 when this frame is free to slide.

Spaced from the tail supporting structure 12, I have mounted a head supporting structure 30 providing a gear casing 31 in which there is rotatably mounted an actuating member 32 suitably held against axial movement and having a threaded bore 33 for the reception of a threaded shaft 34. Upon one end of this threaded shaft there is mounted a clamp 35 which may be operated by a binding screw 35' for gripping the other end of the specimen 37. A spider 36 is slidably mounted upon parallel rods 38, for movement parallel to the axis of the threaded shaft 34, these rods 38 being supported at one end in the casing 31 and at the other end in an upstanding support 39. This spider has a center opening for the reception of clamp member 35, or a portion fixed to threaded shaft 34 which may freely rotate in this spider except when the set screw 40 of the spider is tightened against this portion contained therein, whereupon the clamp then will be prevented from rotary movement but will be permitted to have movement axially of the shaft 34 by the sliding of the spider along the guide rods 38, 38. Check nuts 41 and 42 are provided at either end of the actuating member 32 to bind the member to the shaft so that these parts will rotate together under certain conditions. A gear or drive wheel 43 is fixed upon the member 32 whereby the same may be driven by another suitably meshing gear within the casing 31, which in turn is driven through a magnetic couple.

This magnetic couple is the means by which I am enabled to apply a varied stress upon the specimen being tested with a take-up of any strain in the specimen without variation of the stress. Electric current is used to apply the varied load to the specimen. This load may be applied at any desired rate which usually would be a constant rate of load for purposes which are usually desired. The general principle is that of providing axially aligned shafts with closely spaced ends and mounting on an end of one shaft pole pieces capable of being magnetically energized according to the intensity of a calibrated electric current, while on the end of other shaft I will provide pole pieces with a minimum air space between the poles to serve as armatures completing the magnetic linkage with the pole pieces on the first driving shaft. Said magnetic linkage will transmit energy of torque through this air space between the two electromagnetic poles so that the second shaft will be driven as a direct function of the magnitude of the exciting current. The rate of change of torque may be adjusted to any predetermined gradient of torque and the range of transmitted energy of torque may be very wide. A special form of coupling comprising a modification of structure under the same general principle would have electro-magnetic field excitation in both driving and driven members with electrical connections through commutators or slip rings according to well known engineering practice to increase the efficiency of energy transmission by the coupling.

This magnetic couple consists of a driving means 45 or 45', and a driven means 46. The driving means includes two duplicate drivers, one for causing rotation in one direction and the other for causing rotation in the other direction, each comprising a shaft 47' having a pole piece 47, which is electro-magnetically energized through slip rings 48, and current conductors 49, from a suitable source of electric energy. This shaft 47' in operation is driven at constant speed by motor 50 or 50' from a suitable separate source of electric energy designated generally 51. Any suitable form of switching means as shown at S may be used to control power application to motors 50 and 50' and also with motor 60 whose purpose is hereinafter described. The driven element 46 consists of a shaft 52 provided at each of its ends with a pole piece 53, each close to, but slightly spaced from the pole pieces 47 to provide a slight air gap; each pole piece 53 is provided with an electro-magnetic means energized through the slip rings 54 by the current conductors 49 and capable of generating a magnetic flux field in conjunction with the magnetic field on 47, the relation of the joint fields being such as to transmit torque to 53 when 47 is rotated. The motors 50 and 50' will be driven in opposite directions at a relatively high rate of speed and being at opposite ends of the shaft 52 provide a means whereby shaft 52 may be driven in either of two directions depending upon which source of energy and magnetic couple is used.

The magnetic flux field is such as to transmit torque which will be delivered through the magnetic couple in a value which will be a direct function of the current flow through the circuits 49 or 49', whichever is used; that is, the more current that is flowing in the circuit, the greater will be the magnetic torque transmitted through the couple and the greater the power supplied to do work on the specimen; accordingly I may calibrate this current so that the stress applied to the specimen may be known. It is to be understood that the general principle of electro-magnetic torque coupling as used in this invention is not affected by the specific arrangement of the elements producing the torque transmitting flux filed; in other words, I may deliver electric current to both sides of the coupling to produce a jointly favorable field or may use electric current in one side only and induce a favorable field in the other: moreover, the proportions and respective location of the driving and driven sides of the coupling together with the shape and disposition of the pole pieces and their abutting faces may be altered without changing the essential principle of the device which is to provide a means of applying stress to a test specimen through an electro-magnetic torque-coupling which will permit slip between its members so that a substantially positive and constant rate of load or work may be balanced automatically by the coupling with respect to a variable rate of reactance in the specimen.

In order that the stress may be increased at a constant load rate, I have provided a rheostat 55 in the circuit 49 and a rheostat 55' in the circuit 49', each so arranged that uniform movement of contact arm 57 over each rheostat by a gear 56 will serve to uniformly change the current. One gear will be driven by a rod 58 having a rack 59 engaging the gear, which rod is operated by the motor 60, through clutch 61, shaft 62, worm 63 and worm gear 64 to drive an eccentric 65 which engages the bracket 66 adjustable as at 67 along rod 58 whereby a uniform and constant rate of movement of the rod 58 will cause, according to the shape of bracket 66, a uniform rate of change of current in the circuit 49 through the rheostat 55, or otherwise as the shape of bracket 66 will govern, thus the load may be increased automatically at a constant rate by the cam surface 66$^a$ to apply a constant rate of stress upon the specimen. The arrangement of the rheostat 55' and its gear 56', contact arm 57', operating rod 58', rack 59', its bracket 66', and surface 66$^{a'}$ will be similar to the operation just described except that it will govern the circuit 49' when the reversing motor 50' is in operation. Both rods 58, 58' may be returned to starting position by spring 89, 89'. In case only unidirectional motion is desired the bracket 66' may be removed from engagement with the eccentric, allowing a full cycle of the eccentric to be used on the other bracket. This control may be a separate unit shown in full lines connected by wiring to the machine as indicated by the dotted lines.

In order that a record may be made of any test which is performed, I have provided a support 70 having anti-friction rollers 71 for mounting a platen 72, the platen being moved by means of a link 73 connected to arm 74 of a bracket 75 which is slidable upon the guide rod 77 and moved by the threaded shaft 34 which extends through the threaded sleeve 76 of the bracket, this link serving to either push or pull the platen in response to the direction of movement of the shaft 34.

A suitable chart or calibrated scale 78 is mounted upon the platen with ordinates "*ab*" and abscissa "*xy*" crossing at the origin "*o*." The quadrant upon which the graph is made will indicate whether the specimen is being tested under tension or compression. A pen 80 is indicated, as located at the origin of the chart, and is mounted upon a suitable guide rod 81 slidable in guides 82 and 83 in the support 70. This pen will be moved up and down by some flexible connection 84 extending from the pen over the pulley 85 and being attached to the floating gear 86 mounted between the rack 87, on the rod 58, and the rack 88, on the rod 58′, thus as the intensity of the current increases and the stress on the specimen increases, movement will be imparted to the pen.

In case it is desired to register stress only upon the chart link 73 may be disconnected from platen 72 whereupon vertical motion only of the pen will occur with respect to the chart or a calibrated scale.

In case it is desired to register fatigue or change in strain over a period of time at a constant or sustained stress in contrast to the intermittent method previously described, rotation of eccentric 65 may be halted by clutch 61 at any desired increment of stress whereupon link 73 will slide platen 72 horizontally under the pen.

If it is desired to exert a pull upon or apply a tension test to a specimen 37, the set screw 18 at the tail support and set screw 40 of the spider will be tightened to prevent rotation of the clamp 35 while the nuts 41 and 42 will be loosened, permitting axial movement of the threaded shaft 34 through the actuating member 32. Assuming the pole piece 47 to be rotating at a relatively high rate of speed by the motor 50, and a small supply of energy to the pole piece 47, an electromagnetic torque will be created therein, this magnetic torque will be transmitted to the pole piece 53, which will tend to turn the shaft 52 transmitting through the gears in the casing including the gear 43, motion to rotate actuating member 32 to exert a pull upon the specimen 37. At the same time the motor 60 will cause a constant rate of increase of current in the line 49 by a decreasing of the resistance through rheostat 55 and as the magnetism is increased in the pole 47 the torque upon the pole 53 will be increased to transmit through the gears in the casing and the threaded shaft an increase in the pull on the specimen and this condition will exist regardless of whether the specimen elongates or not, thus a constant rate of increase of pull is provided regardless of the elongation of the specimen. This rate of increase may be exceedingly fast, in fact faster than the gravitational influence upon a weight so that the rate of increase of load is unrestricted.

Meanwhile the platen will be moving to the left in Fig. 1 at the same time so that a graph will be drawn in the upper right hand quadrant "ay" of the chart to denote the characteristics of the specimen undergoing the test. After the eccentric 65 has reached the bottom of its arc of movement the rod 58 will be drawn upwardly by spring 89 and the test specimen will be relaxed under a definite load rate by the current in the circuit 47 being uniformly decreased. After the revolution of the eccentric is completed load will again be applied, etc., for hysteresis characteristics of the specimen.

Should a compression, shear, or bending test be desired to be performed upon a specimen 21, the set screws 18 in the tail support will be loosened to permit movement of the frame 14. Some rod in place of specimen 37 will be inserted so that thrust may be transmitted. Energy will be taken from the magnetic coupling 45′, and an increase in the current will be effected through the rheostat 55′ in the circuit 49′. The platen with the recording chart in this case will move to the right in Fig. 2 and the test will be recorded in the lower left hand quadrant "bx".

In case it is desired to perform a twisting test upon a specimen, the set screws 18 may be optionally tightened or loosened depending upon whether take-up in the length of the specimen due to the twisting is desired or not. The set screw 40 on the spider 36 may be loosened to permit rotation of the clamp 35. Check nuts 41 and 42 will be tightened against the actuating member 32 to clamp the member to the shaft 34. Power now transmitted to the actuating member will cause it and the shaft to rotate. This rotation of the shaft 34 will cause it to rotate in the threaded sleeve 76 to cause movement of the bracket 75.

A utilization of one of the motors and the magnetic couple, say for instance 45, will cause the shaft to be turned in a clockwise direction with a resultant twist occurring in specimen 37. The increase in the power applied will be as before, through the control rheostat 55 at a constant load rate. Upon completion of the twist in one direction the result may be recorded or if desired an untwisting and twisting in the opposite direction may be effected by the utilization of the magnetic couple 45′, with a control of the energy supply 49′ by the rheostat 55′. It will also be apparent that by the use of mechanism enabling operation in both directions hysteresis tests may be provided.

Thus, the testing machine described is a means of applying various forms of stress at any predetermined load rate, which may be a constant load rate, with the primary aid of magnetic torque couplings in which the coupling energy is varied at a predetermined rate by automatic mechanical means to vary the stress load at an equivalent rate regardless of resultant deformation of the specimen, for the purpose of measuring tensile, compression, flexing or bending, torsion and shear strains in specimens.

In the foregoing specification I have referred specifically to the use of this invention in connection with testing but it will be appreciated, that the broader aspect of this invention is that of a machine for load measurement using the electro-magnetic torque coupling operated by means of a calibrated electric circuit for the purpose of weighing load as measured by the calibrated electric circuit controlling power of said electro-magnetic torque coupling. I also desire it to be understood that I reserve the privilege of resorting to all the mechanical changes to which the device is susceptible, the invention being defined and limited only by the terms of the appended claims.

I claim:

1. In a testing machine, a magnetic torque coupling through which stress is applied to a test specimen, said coupling comprising a driving member adapted to be electro-magnetically energized and a driven member adapted to receive electro-magnetic energy from the driving member in the transmission of torque, means for rotating said driving member at constant speed, means for supplying a calibrated separately controlled electric current to said driving member, means to connect said driven member to the specimen, said driven member being free to rotate in proportion to the resulting strain in the specimen, whereby said rotation permits a balance of strain for any degree of applied stress and whereby the application of a substantially constant load rate through the coupling may be had.

2. In a testing machine, a magnetic torque coupling through which stress is applied to a test specimen, said coupling comprising a driving means adapted to be electro-magnetically energized and a driven means adapted to receive electro-magnetic energy from the driving means in the transmission of torque, means for rotating said driving means at constant speed in either of two effective directions, means for supplying a calibrated separately controlled electric current to said driving means, means to connect said driven means to the specimen, said driven means being free to rotate in proportion to the resulting strain in the specimen, whereby said rotation permits a balance of strain for any degree of applied stress and whereby the application of a substantially constant load rate through the coupling may be had.

3. In a testing machine, a magnetic couple through which stress is applied to a test specimen, said couple comprising a driving means adapted to be electro-magnetically energized, and a driven member adapted to receive electro-magnetic energy from the driving means, means to vary the supply of electric current to said driving means at a predetermined load rate to vary the stress applied to the test specimen, a recording means, and means actuated by the movement of a part directly connected to the test specimen and by the current supply control for operating said recording means.

4. In a testing machine, a magnetic torque coupling through which stress is applied to a test specimen, said coupling comprising a driving member adapted to be electro-magnetically energized and a driven member adapted to receive electro-magnetic energy from the driving member in the transmission of torque, means for rotating said driving member at constant speed, means for supplying a calibrated separately controlled electric current to said driving member, means to connect said driven member to the specimen, said driven member being free to rotate in proportion to the resulting strain in the specimen, whereby said rotation permits a balance of strain for any degree of applied stress and whereby the application of a substantially constant load rate through the coupling may be had, a recording device moving in response to the value of the supplied electric current and the movement of the means connected to the specimen for operating said recording device.

5. In a testing machine, a magnetic torque coupling through which stress is applied to a test specimen, said coupling comprising a driving means adapted to be electro-magnetically energized and a driven means adapted to receive electro-magnetic energy from the driving means in the transmission of torque, means for rotating said driving means at constant speed in either of two effective directions, means for supplying a calibrated separately controlled electric current to said driving means, means to connect said driven means to the specimen, said driven means being free to rotate in proportion to the resulting strain in the specimen, whereby said rotation permits a balance of strain for any degree of applied stress and whereby the application of a substantially constant load rate through the coupling may be had, a recording device movable in response to the value of the supplied electric current and the movement of the means connected to the specimen for operating said recording device.

6. In a testing machine, relatively movable elements for engaging the test specimen, means for moving one of said elements comprising a linked magnetic couple through which force is applied to take up any relative movement in the elements engaging the specimen, and electric circuit means connected to said magnetic couple for controlling the power input to change the current at a constant rate.

7. In a testing machine, relatively movable elements for engaging the test specimen, means for moving one of said elements comprising a magnetic torque coupling having driving and driven members with a provision for slip between them, means comprising a movable member for regulating the load rate of the coupling and a cam for controlling said member for maintaining a substantially constant load rate.

8. In a testing machine, relatively movable elements for engaging the test specimen, means for moving one of said elements comprising a pair of electro-magnetically energized couples for transmitting successively opposed values of stress to a specimen, cam-operated means for regulating the energizing of the couples for the applying of stress and the relief of stress in a unit time cycle, and means for regulating the cam-operated means for optionally obtaining successive single application and relief of stress values in the same time cycle.

9. In a testing machine, relatively movable elements for engaging the test specimen, means for moving one of said elements comprising a magnetic couple through which stress is applied to a test specimen, said couple comprising a rotary driving means adapted to be electro-magnetically energized, and a rotary driven member adapted to receive electro-magnetic energy from the driving member, and means to vary the supply of electric current to said driving means at a predetermined load rate to vary the stress applied to the test specimen.

10. In a testing machine, relatively movable elements for engaging the test specimen, means for moving one of said elements comprising a magnetic couple through which stress is applied to a test specimen, said couple comprising a driving means adapted to be electro-magnetically energized, and a driven member adapted to receive electro-magnetic energy from the driving member, means including a movable member to vary the supply of electric current to said driving means, and a cam for engaging and controlling said member to apply a stress to the test specimen at a predetermined load rate.

11. In a testing machine, relatively movable elements for engaging the test specimen, means for moving one of said elements comprising a magnetic couple through which stress is applied to a test specimen, said couple comprising a rotary driving means adapted to be electro-magnetically energized, and a rotary driven member adapted to receive electro-magnetic energy from the driving means, means to vary the supply of electric current to said driving means at a predetermined load rate to vary the stress applied to the test specimen, a recording means, and means actuated by the current supply control for operating said recording means.

12. In a testing machine, relatively movable elements for engaging the test specimen, means for moving one of said elements comprising an electro-magnetic torque coupling through which stress is applied, said coupling having two rotary electro-magnets having predetermined values of torque with physical and mechanical separation between them, and means to rotate said magnets while permitting intermittent variation with differences of rates of rotation as a result of the take-up of the strain of the specimen.

13. In a testing machine, relatively movable elements for engaging the test specimen and relatively movable through a considerable extent due to changes in the specimen, a motor, means operable by said motor for moving one of said elements including a linked magnetic couple through which force is applied to one element to take up any relative movement between the elements engaging the specimen, and electric current means for controlling the magnetic couple.

14. In a testing machine, relatively movable elements for engaging the test specimen and relatively movable through a considerable extent due to changes in the specimen, a motor, a linked electro-magnetic torque couple through which force is applied from the motor to one element to take up any relative movement in the elements engaging the specimen, means operable by the motor for revolving one part of said couple and electric circuit means for controlling the magnetic couple.

15. In a testing machine, relatively movable elements for engaging the test specimen, means for moving one of said elements comprising a magnetic couple through which stress is applied to a test specimen, said couple comprising a rotary driving member adapted to be electro-magnetically energized, and a rotary driven member adapted to receive electro-magnetic energy from the driving member, and means to vary the supply of electric current to one of said members at a predetermined load rate to vary the stress applied to the test specimen.

PYAM L. PENDLETON.